(12) United States Patent
Kim et al.

(10) Patent No.: US 8,305,544 B2
(45) Date of Patent: Nov. 6, 2012

(54) LIQUID CRYSTAL DISPLAY AND METHOD FOR MANUFACTURING THE SAME

(75) Inventors: Bong Chul Kim, Daegu-si (KR); Hyeon Jin Seo, Gumi-si (KR); Jeong Hoon Lee, Gumi-si (KR); Dhang Kwon, Daejeon-si (KR); Hang Sup Cho, Gumi-si (KR); Ho Su Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/233,955

(22) Filed: Sep. 15, 2011

(65) Prior Publication Data

US 2012/0008084 A1      Jan. 12, 2012

Related U.S. Application Data

(62) Division of application No. 12/233,355, filed on Sep. 18, 2008, now Pat. No. 8,040,485.

(30) Foreign Application Priority Data

Sep. 21, 2007   (KR) ........................ 10-2007-0096482

(51) Int. Cl.
G02F 1/1339   (2006.01)

(52) U.S. Cl. ...................................................... 349/155
(58) Field of Classification Search ................... 349/155
See application file for complete search history.

(56) References Cited

U.S. PATENT DOCUMENTS

| 7,061,568 | B2 | 6/2006 | Yamaguchi et al. | |
| 7,630,042 | B2 * | 12/2009 | Yoon | 349/129 |
| 2008/0129947 | A1 * | 6/2008 | Kim et al. | 349/156 |
| 2008/0266498 | A1 | 10/2008 | Kim et al. | |

* cited by examiner

*Primary Examiner* — Eric Wong
(74) *Attorney, Agent, or Firm* — Birch, Stewart, Kolasch & Birch, LLP

(57) ABSTRACT

A liquid crystal display (LCD) device and a method for manufacturing the same are discussed. According to an embodiment, the liquid crystal display device includes a first substrate and a second substrate facing each other, wherein each of the first and second substrates includes pixel regions to form a matrix, a black matrix layer arranged in a region other than the pixel regions gate lines and data lines arranged in a portion corresponding to the black matrix layer spacers arranged in predetermined portions provided on the black matrix layer wherein each of the plurality of spacers includes one or more balls, and a solid to adhere the one or more balls to the first or second substrate, and a liquid crystal layer filled between the first substrate and the second substrate.

9 Claims, 7 Drawing Sheets

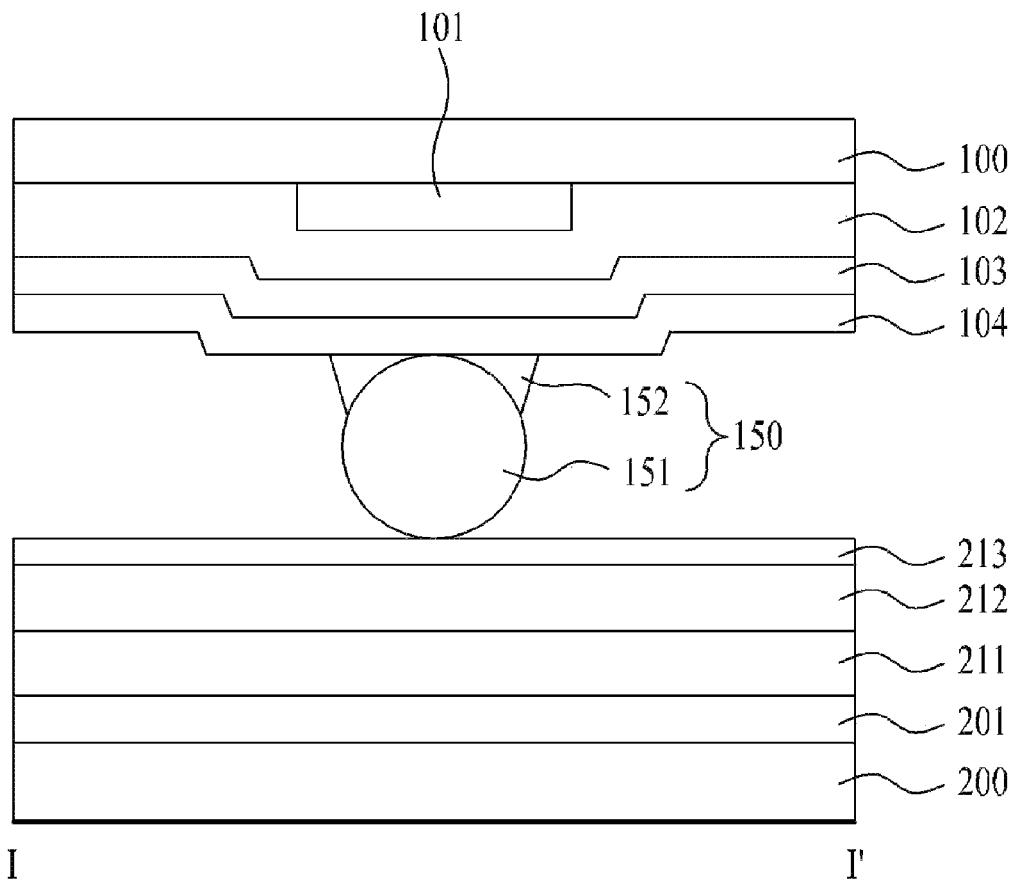

LIQUID CRYSTAL DISPLAY AND METHOD FOR MANUFACTURING THE SAME

CROSS-REFERENCE TO RELATED APPLICATIONS

This application is a divisional of U.S. patent application Ser. No. 12/233,355 filed on Sep. 18, 2008 now U.S. Pat. No. 8,040,485, which claims the priority to Korean Patent Application No. 10-2007-0096482, filed on Sep. 21, 2007. The entire contents of each of these applications are hereby incorporated by reference.

BACKGROUND OF THE INVENTION

1. Field of the Invention

The present invention relates to a liquid crystal display (LCD) device. More particularly, the present invention relates to a liquid crystal display (LCD) device and a method for manufacturing the same, wherein, after balls are formed in an ink-jetting manner, a solid is left behind on the surface where the balls are formed, thus causing improvement of the adhesion force between the balls and substrates.

2. Discussion of the Related Art

With the progress of information-dependent society, the demand for various display devices has increased. To meet such a demand, efforts have recently been made to research flat panel display devices such as liquid crystal displays (LCDs), plasma display panels (PDPs), electro-luminescent displays (ELDs) and vacuum fluorescent displays (VFDs). Some types of such flat panel displays are being practically applied to various appliances for display purposes.

Of these, LCDs are currently most widely used as substitutes for cathode ray tubes (CRTs) in association with mobile image display devices because LCDs have advantages of superior picture quality, lightness, slimness, and low power consumption. Various applications of LCDs are being developed in association with not only mobile image display devices such as monitors of notebook computers, but also monitors of TVs to receive and display broadcast signals, and monitors of laptop computers.

Successful application of such LCDs to diverse image display devices depends on whether or not the LCDs can realize desired high picture quality including high resolution, high brightness, large display area, and the like, while maintaining desired characteristics of lightness, slimness and low power consumption.

Hereinafter, the structure of a conventional LCD device will be described with reference to the annexed drawings.

FIG. 1 is a plan view illustrating a conventional LCD provided with a column spacer. FIG. 2 is a sectional view taken along the line I-I' of FIG. 1.

As shown in FIGS. 1 and 2, a conventional LCD array region comprises gate lines 4 and data lines 5 that intersect each other to define pixel regions, thin film transistors (TFT) each formed at an intersection between the gate line 4 and the data line, and pixel electrodes 6 formed in each of the pixel regions. The array region further comprises column spacers 20 uniformly spaced apart from one another, to maintain a cell gap. In FIG. 1, column spacers 20 are arranged at respective pixels, each of which includes three sub-pixels, i.e., R, G and B sub-pixels.

As shown in FIG. 2, each column spacer 20 is arranged in a region provided above the gate line 4. That is, the gate line 4 is arranged on a first substrate 1, a gate insulating film 15 is arranged over the entire surface of the first substrate 1 including the gate line 4, and a passivation film 16 is arranged on the gate insulating film 15.

Meanwhile, a second substrate 2 comprises a black matrix layer 7 to shield non-pixel regions (portions where gate lines, data lines and thin film transistors are formed) other than the pixel regions. In addition, R, G and B color filter layers are formed at respective pixel regions on the second substrate 2 including the black matrix layer 7, and a common electrode 14 is arranged over the entire surface of the second substrate 2 including the color filter layers 8.

The column spacers 20 are formed on portions of the common electrode 14 corresponding to the gate lines 4. Accordingly, the first and second substrates 1 and 2 are joined together such that the column spacers 20 are arranged on the gate lines 4.

The column spacers 20 are formed in an array process of the first substrate 1 or the second substrate 2. The column spacers 20 are fixedly formed in the form of columns with a certain height on the predetermined substrate.

The column spacers 20 are fixed in specific positions and thus do not move, when liquid crystals are dropped to form a liquid crystal layer. Advantageously, the column spacers do not inhibit the liquid crystals from flowing. However, the column spacers have a large area in contact with the corresponding substrate, thus disadvantageously causing display defects, e.g., touch defects.

LCDs including the aforementioned column spacers suffer from the following problems.

A region, where the liquid crystal panel of the conventional column spacers-comprising LCDs is touched in a certain direction by hand or other objects, is stained. This stain is formed upon touch and is thus referred to as a "touch stain". As such, the stain is observed on the screen and thus is also called a "touch defect". Such a touch defect is considered to be attributed to the high frictional force which is caused by the large contact area between the column spacer and the corresponding substrate, as compared to conventional ball spacer structures. That is, because column spacers have a large area in contact with the corresponding substrate, as compared to ball spacers, after upper and lower substrates shift towards each other upon touching, they take a long time to return to an original state and stains thus remain until they completely return to the original state.

Accordingly, efforts have made to use ball spacers in liquid crystal panels. In these cases, the ball spacers move and deviate from their original positions in fabrication and use due to their mobility, thus causing other problems. Research is being conducted on solving these problems.

SUMMARY OF THE INVENTION

Accordingly, the present invention is directed to a liquid crystal display (LCD) device and a method for manufacturing the same that substantially obviate one or more problems due to limitations and disadvantages of the related art.

An object of the present invention is to provide a liquid crystal display (LCD) device and a method for manufacturing the same, wherein after balls are formed in an ink-jetting manner, a solid is left behind on the surface where the balls are formed, thus causing improvement of the adhesion force between the balls and substrates.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises: a first substrate and a second substrate facing each other, wherein each of the first and second substrates includes a plurality of pixel regions spaced apart from each other to form a matrix; a black matrix layer arranged in a region excluding the pixel regions on the first substrate; a plurality of gate lines and a plurality of data lines crossing each other, are corresponding to the black matrix layer on the second substrate; a plurality of spacers arranged in predetermined portions provided on the black matrix layer between the first and second substrates, wherein each spacer includes one or more balls, and a solid to adhere the balls to the first or second substrate; and a liquid crystal layer filled between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a sectional view taken along the spacer of FIGS. 8A and 8B.

DETAILED DESCRIPTION OF THE INVENTION

Hereinafter, an LCD device and a method for manufacturing the same according to the present invention will be described with reference to the annexed drawings.

Taking into consideration the fact that the large contact area between conventional column spacers and the opposite substrate causes display defects such as touch defects, attempts have been made to solve the defects by reducing the contact area with the opposite substrate. Of these attempts, a method for manufacturing ball spacers by ink-jetting was suggested.

Figure 1:
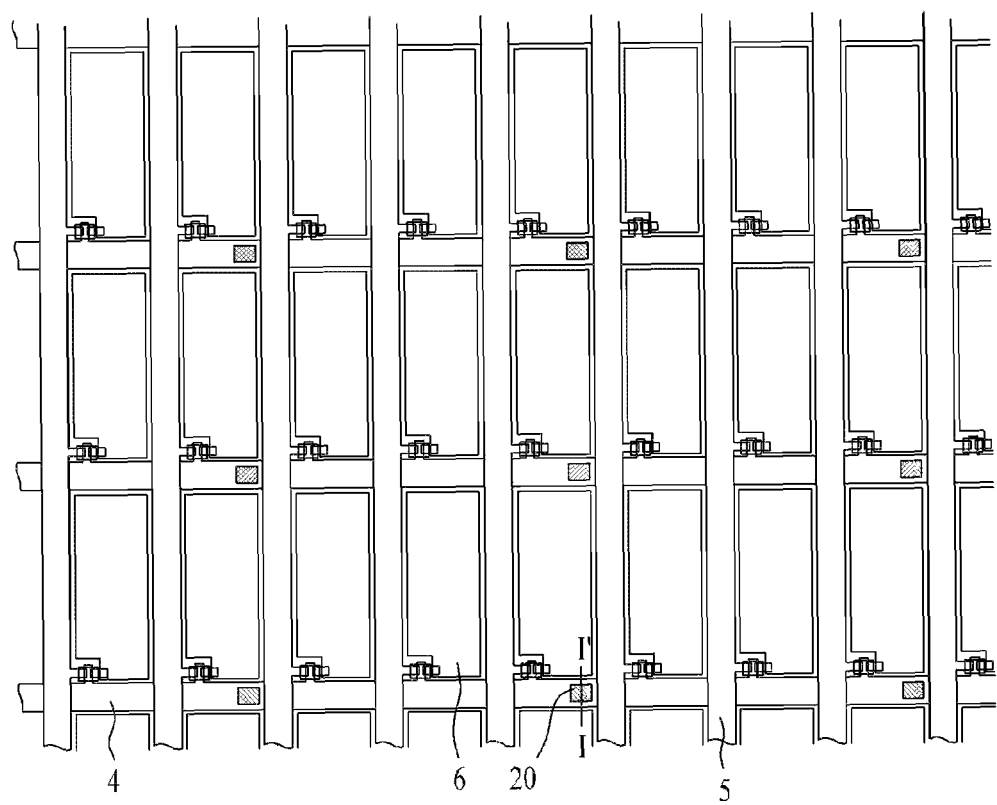
FIG. 1 is a plan view illustrating a conventional liquid crystal display device.
Figure 2:
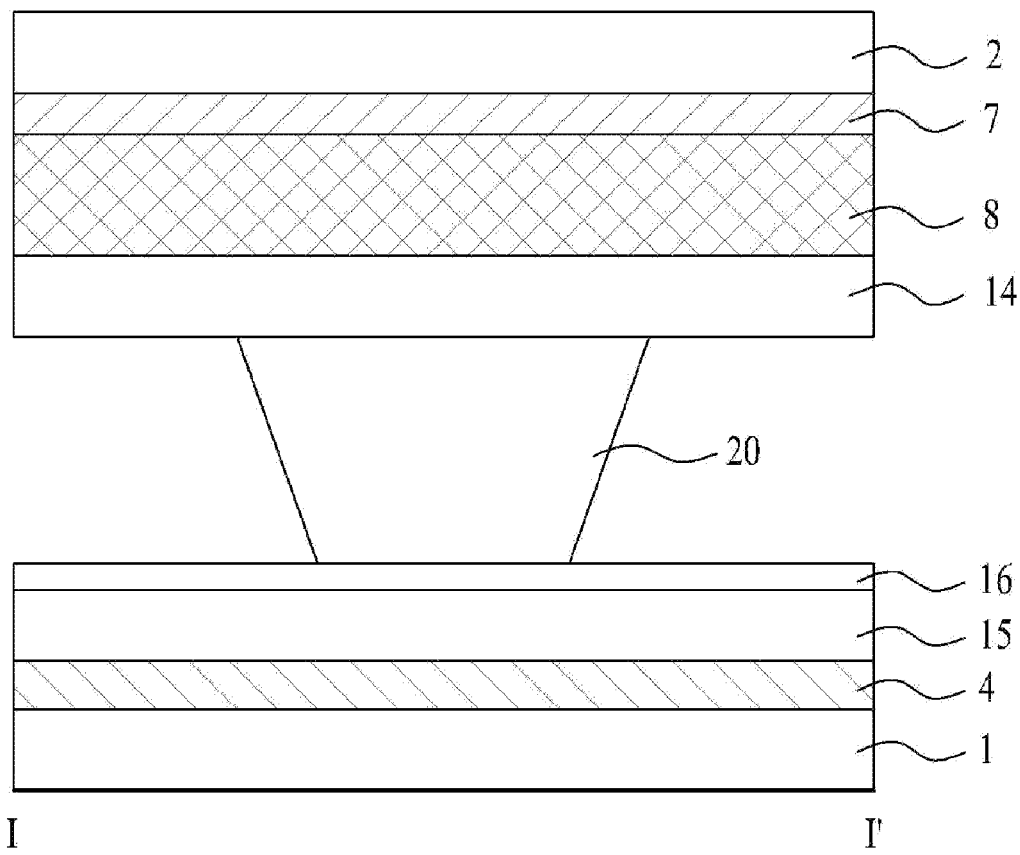
FIG. 2 is a sectional view taken along the line I-I' of FIG. 1.
Figure 3:
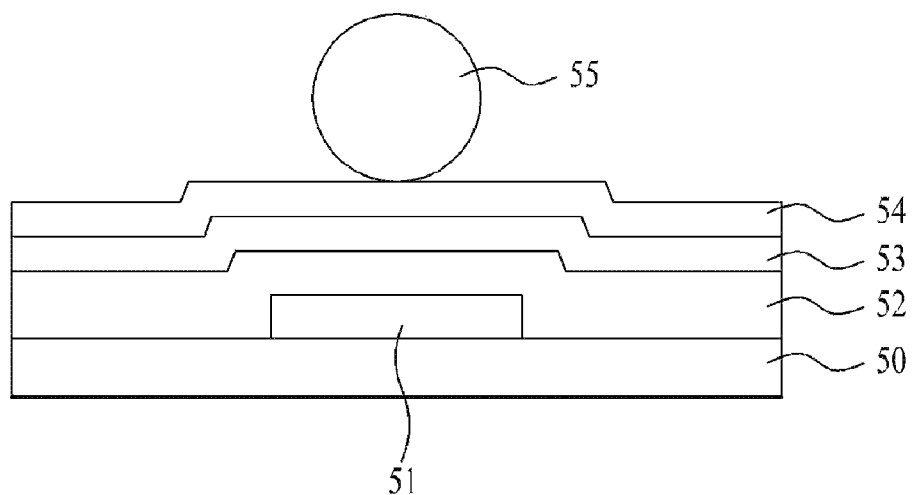
FIG. 3 is a sectional view illustrating a liquid crystal display device using a ball spacer.
Figure 4:
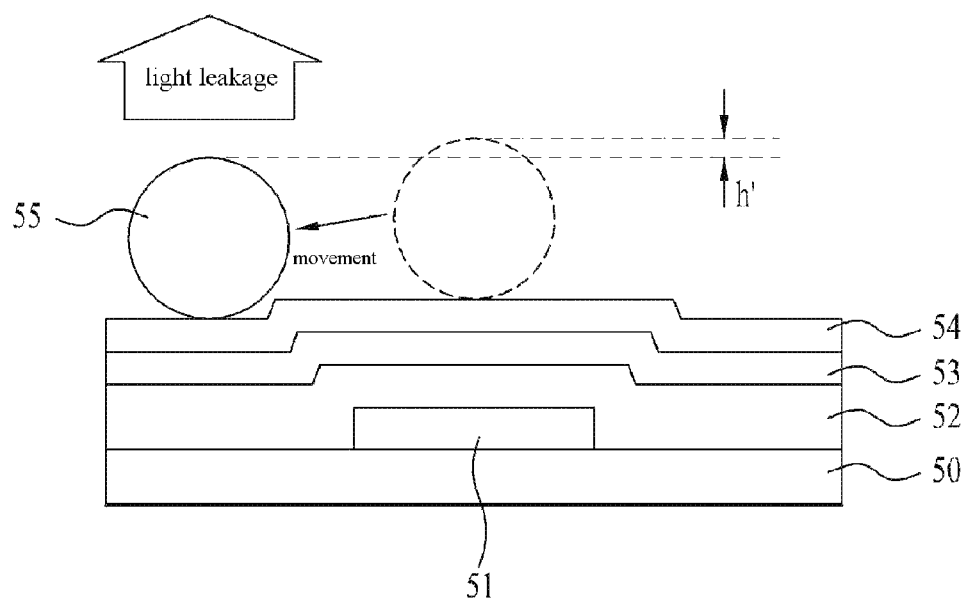
FIG. 4 is a sectional view illustrating a state in which the ball spacer of FIG. 3 moves upon fabrication or use.

FIG. 3 is a sectional view illustrating a liquid crystal display device using a ball spacer. FIG. 4 is a sectional view illustrating a phenomenon in which movement of the ball spacer of FIG. 2 occurs upon fabrication or use.

As shown in FIG. 3, in the liquid crystal display device using the ball spacer, the ball spacer 55 is arranged on the structure including a black matrix layer 51, a color filter layer 52, an overcoat layer 53 and an alignment film 54 arranged on a second substrate 50 in this order.

Recently, a method in which the ball spacer 55 is dotted in a desired position by ink-jetting has been suggested. After the ball spacer 55 is formed in the desired position, it moves from the position due to an applied external force during the formation process or an applied impact in use, as shown in FIG. 4, thus disadvantageously causing light leakage. That is, when the ball spacer 55 deviates from the original position, it comes out of the portion provided above the black matrix layer 51 and rolls toward the side of the portion. At this time, a height difference between the top of the ball spacer 55 which is dotted in the initial position, and the top of the ball spacer 55 which is arranged in the final position occurs, which is substantially comparable to the thickness of the black matrix layer 51. Such a height difference may cause variation in cell gap after the ball movement. In addition, the height difference involves problems in that an aperture ratio is decreased due to the ball spacer 55 arranged out of regions provided by the black matrix layer. Furthermore, the ball spacer 55 arranged in the pixel region results in distorted orientation of liquid crystal, thus causing light leakage.

Hereinafter, a liquid crystal display and a method for manufacturing the same, capable of solving the problems associated with formation of the ball spacer, will be illustrated with reference to the annexed drawings.

Figure 5A:
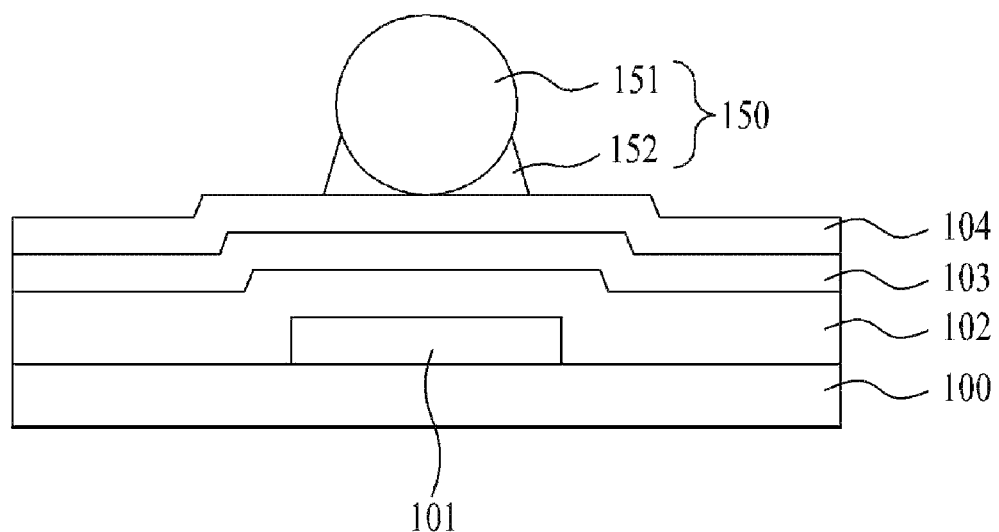
FIGS. 5A and 5B are sectional views illustrating states of the liquid crystal display device according to the present invention upon fabrication and use, respectively.
Figure 5B:
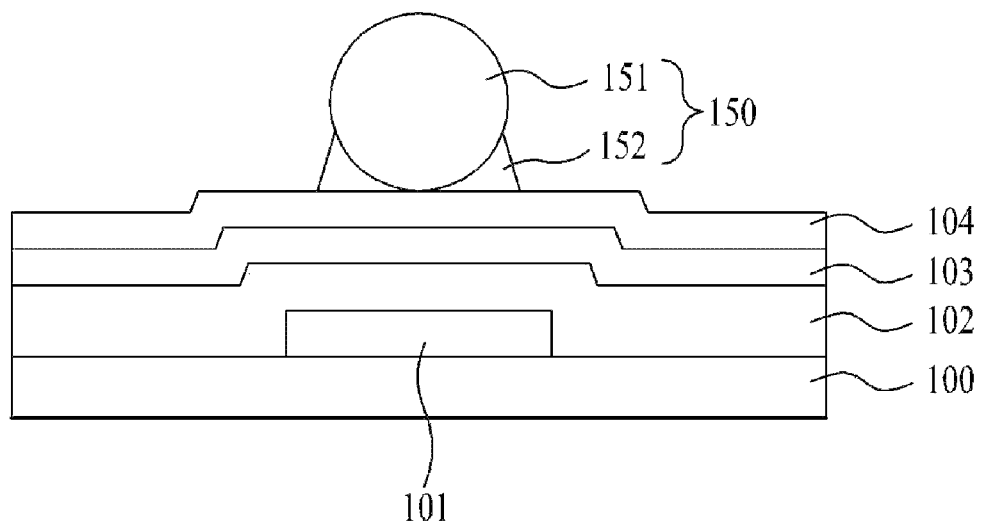

FIGS. 5A and 5B are sectional views illustrating states of the liquid crystal display device according to the present invention upon fabrication and use, respectively.

As shown in FIG. 5A, the liquid crystal display device of the present invention comprises: a first substrate 100 including pixel regions spaced apart from each other to form a matrix, a black matrix layer 101 arranged in a region other than the pixel regions on the first substrate 100; a color filter layer 102 arranged on the black matrix layer 101 in at least portions corresponding to the pixel regions; an overcoat layer 103 or a common electrode (not shown) arranged on the entire surface of the first substrate 100 including the black matrix layer 101 and the color filter layer 102; and a first alignment film 104 arranged on the overcoat layer 103 or the common electrode.

In addition, the first substrate further comprises a spacer 150 arranged in a portion provided above the black matrix layer 101 on the first alignment film 104, in which the spacer 150 includes balls 151 and a solid 152 to adhere the balls 151 to the first alignment film 104.

The spacer 150 is formed in accordance with an ink-jetting method, which is performed by jetting a spacer-forming material from the head in a predetermined position on the first alignment film 104. Upon each jetting, the head comprises a plurality of balls 151, to cause the spacer 150 to remain in the form of an aggregate in the predetermined position. The spacer-forming material contained in the head consists of 2 to 20 wt % of a thermosetting binder in a liquid state of the solid 152, 80 to 98 wt % of a solvent (not shown), and 0.1 to 3 wt % of the balls 151, with respect to the total weight of the thermosetting binder and the solvent.

In the process of such ink-jetting, the spacer-forming material including the plurality of balls is jetted in the corresponding region and then cured at about 80 to 300° C. As a result, the liquid thermosetting binder is cured and then solidified in the form of an aggregate including the plurality of balls 151, to form a solid, while the solvent is vaporized.

The solid is a thermosetting binder. For example, the solid includes at least one organic compound selected from acrylic, urethane, epoxy and silicone compounds. Examples of acrylic compounds may include ethyl methacrylate, N-butyl methacrylate, isobutyl methacrylate, dicyclopentanyl methacrylate, benzyl methacrylate, glycidyl methacrylate, 2-hydroxyethyl methacrylate, methacrylic acid isobornyl methacrylate and styrene polymers, and combinations thereof.

In addition, the spacers are formed by ink-jetting a liquid material consisting of the liquid thermosetting binder and the solvent, followed by curing. In the curing process, the thermosetting binder is cured, while the solvent is vaporized. The curing is carried out at 80 to 300° C.

The solvent is selected from those that have a boiling point of 60 to 300° C. For example, a glycol ether may be used as the solvent. Examples of useful glycol ethers include propylene glycol methyl ether (PGME), dipropylene glycol methyl ether (DGME), tripropylene glycol methyl ether (TGME), propylene glycol methyl ether acetate (PGMEA), dipropylene glycol methyl ether acetate (DGMEA), propylene glycol n-propyl ether (PGPE), dipropylene glycol n-propyl ether (DGPE), propylene glycol n-butyl ether (PGBE), dipropylene glycol n-butyl ether (DCBE), tripropylene glycol n-butyl ether (TGBE), propylene glycol phenyl ether (PGPE), propylene glycol diacetate (PGD), dipropylene glycol dimethyl ether (DGDE), diethylene glycol ethyl ether (DGEE), diethylene glycol methyl ether (DGME), diethylene glycol n-butyl ether (DGBE), diethylene glycol hexyl ether (DGHE), diethylene glycol n-butyl ether acetate (DGBEA), ethylene glycol propyl ether (EGPE), ethylene glycol n-butyl ether (EGBE), ethylene glycol hexyl ether (EGHE), ethylene glycol n-butyl ether acetate (EGBEA), triethylene glycol methyl ether (TGME), triethylene glycol ethyl ether (TGEE), triethylene glycol n-butyl ether (TGBE), ethylene glycol phenyl ether (EGPE) and ethylene glycol n-butyl ether mixtures (EGBEM).

Preferably, the solvent has a surface tension of 20 to 80 dynes/cm, a viscosity of 1 to 30 cP and a density of 0.8 to 1.2 g/cc at ambient temperature. Based on these properties, the solvent is vaporized and removed during curing at about 80 to 300° C.

In addition, the balls 151 are made of an organic compound e.g. divinylbenzene. The balls 151 can be distinguished from other ingredients, in that the balls 151 are present in the form of a white powder, while the solid and the solvent are in a liquid state. If necessary, the balls 151 may be subjected to surface-treatment prior to being mixed to form the spacer-forming material so that they can be distinguished from other liquid components.

As shown in the drawings, the spacer 150 may be formed on the first alignment film 104. Alternatively, in reverse, after the spacer is formed on the overcoat layer 203 or the common electrode, the first alignment film 104 may be formed on the overcoat layer 103 or the common electrode.

The spacer 150 has a height that corresponds to a cell gap between the first substrate 100 and the second substrate (not shown, please refer to reference numeral "200" in FIG. 9), which is comparable to the diameter of the balls 151 contained therein. Each spacer 150 may include one ball 151 or may take the form of an aggregate including a plurality of balls 151.

When the spacer 150 is composed of the plurality of balls 151, it has a two-dimensional oval-like shape within the range of the width of the black matrix layer 101. That is, the number of the balls 151 increases towards the center of the spacer, and on the other hand, the number of the balls 151 decreases towards the edge of the spacer. The solid 152 prevents the jetted balls 151 from being dispersed in the portion where the spacer 150 is to be formed, instead being aggregated. Thus, the solid 152 functions to fix the balls 151 on the first alignment film 104 or the overcoat layer. The spacer 150 has an oblate shape, because the spacer-forming material is in a liquid state upon jetting, and is thus partially spread in the jetted portion.

Meanwhile, the color filter layer 102 may be arranged on the black matrix layer 101 in pixel regions, as shown in the drawings. In some cases, the color filter layer 102 may be selectively arranged only in pixel regions, or partially overlapped with the black matrix layer 101 in the portion provided by the black matrix layer 101.

Although not illustrated, the second substrate 200 that faces the first substrate 100 includes a plurality of gate lines and a plurality of data lines such that the gate lines and the data lines intersect each other to define pixel regions corresponding to the black matrix layer 101; thin film transistors (TFTs) located at each intersection of an associated data line and gate line; and pixel electrodes arranged in the respective pixel regions. A detailed explanation thereof will be provided with reference to FIGS. 8A and 8B, and 9.

Referring to FIG. 5B, even if impact occurs in the process of joining the first substrate 100 including the spacer 150 to the opposite substrate, assembling the substrates, or using the substrates, the solid 152 is cured while maintaining its jetted state, without movement of the balls, thus allowing the balls 151 to remain adhered to the first substrate 100. As a result, light leakage caused by movement of the balls, or display defects due to variation in cell gap can be prevented.

Furthermore, the spacer 150 is in contact with the opposite substrate only through the surface of the ball 151. Accordingly, the spacer 150 has a dot-like narrow area in contact with the opposite substrate. Consequently, although upon touching, the two substrates shift towards each other, the frictional force generated thereby can be reduced, thus making the substrates rapidly return to their original states. As a result, display defects such as touch defects can be prevented.

Figure 6:
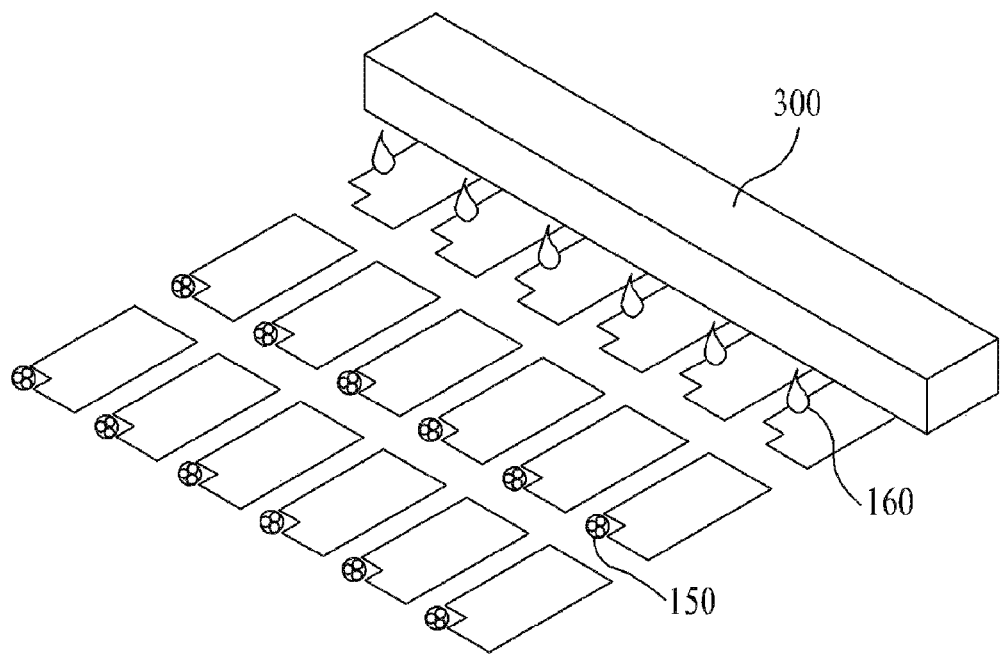
FIG. 6 is a flow chart illustrating a method for manufacturing a spacer of the liquid crystal display device according to the present invention.
Figure 7:
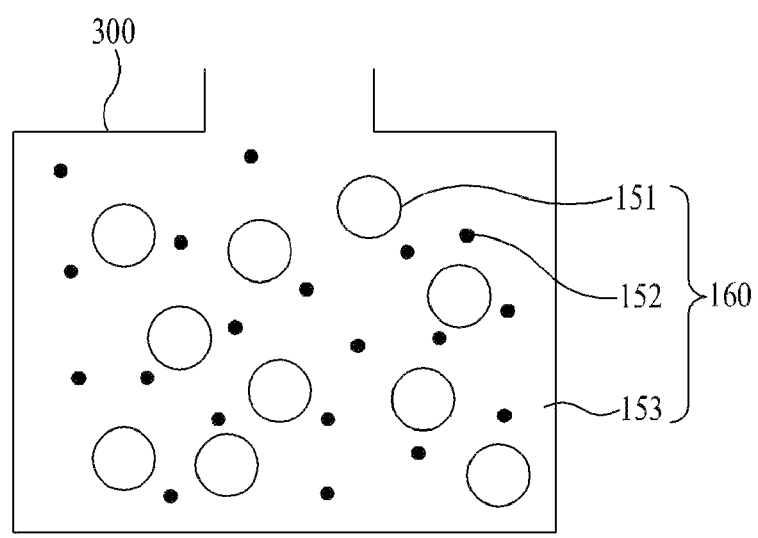
FIG. 7 is a schematic view illustrating a head used for an ink-jetting process of FIG. 6.

FIG. 6 is a flow chart illustrating a method for manufacturing a spacer of the liquid crystal display device according to the present invention. FIG. 7 is a schematic view illustrating a head used for an ink-jetting process of FIG. 6.

As shown in FIGS. 6 and 7, in the liquid crystal display device of the present invention, the spacers are formed by jetting a predetermined amount of spacer material 160 through nozzles (not shown) provided in an ink-jet head 300 at one or more pixels on the substrate. At this time, by controlling the distance between the nozzles, each time jetting is performed in a predetermined portion, a plurality of the balls 151 contained in the spacer material 160 can be jetted therein.

At this time, as shown in FIG. 7, the inkjet head 300 contains the spacer material. The spacer material contained in the inkjet head 300 comprises: 1 to 20 wt % of a liquid thermosetting binder 152 and 80 to 98 wt % of a solvent 153, each being present in a liquid state; and 0.1 to 3 wt % of the balls 151, with respect to 100 wt % of the total weight of the thermosetting binder 152 and the solvent 153.

The spacer components, i.e., the balls, the liquid thermosetting binder and the solvent are the same as mentioned above.

Figure 8A:
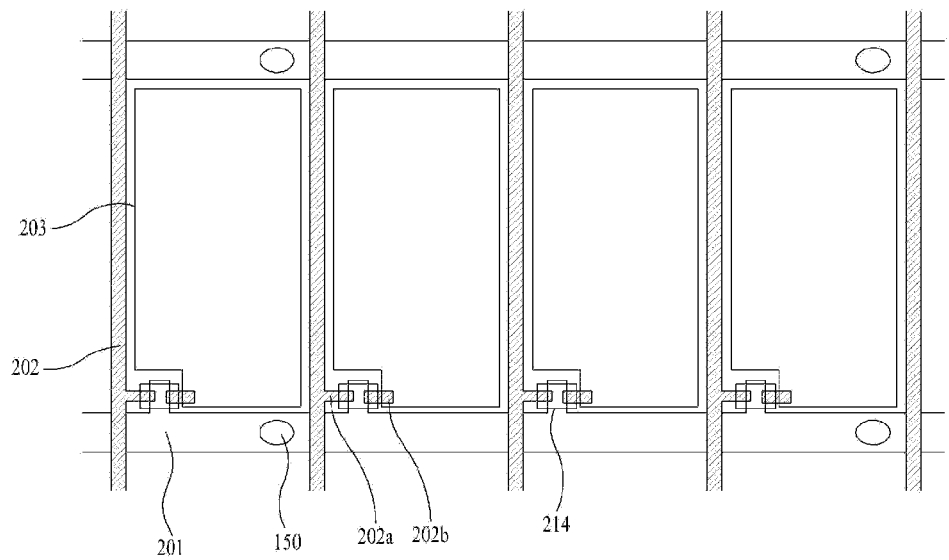
FIGS. 8A to 8B are plan views illustrating the liquid crystal display device according to exemplary embodiments of the present invention.
Figure 8B:
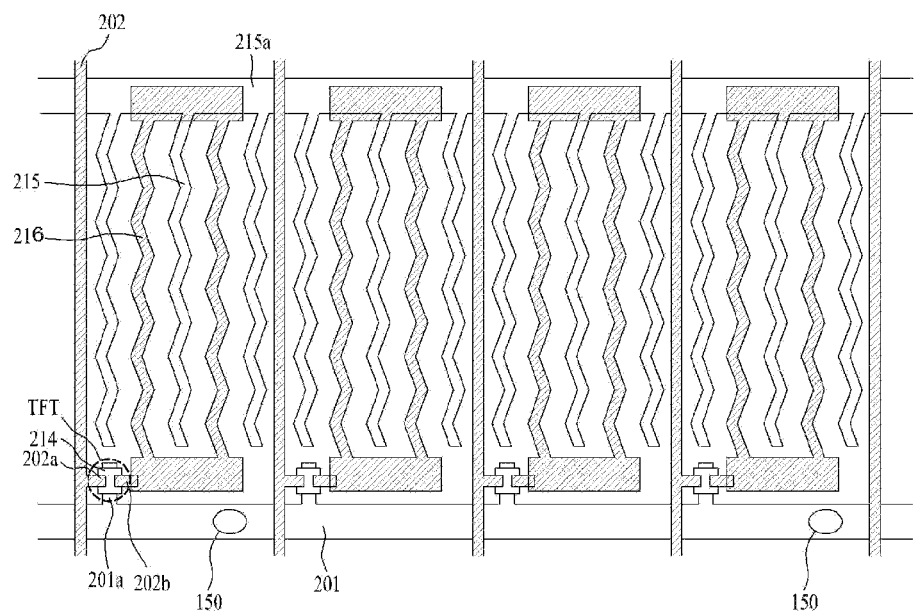

FIGS. 8A and 8B are plan views illustrating liquid crystal display devices according to preferred embodiments of the present invention. FIG. 9 is a sectional view taken along the spacer parallel to the data line of FIGS. 8A and 8B.

FIG. 8A is a plan view illustrating a twisted nematic (TN) mode liquid crystal display device. FIG. 8B is a plan view illustrating an in-plane switching (IPS) mode liquid crystal display device. TN and IPS mode LCDs are identical to each other, except that the structure provided on a first substrate 100 arranged above a liquid crystal layer (not shown) is either an overcoat layer 103 or a common electrode (not shown). In some cases, TN mode LCDs may include both the overcoat layer and the common electrode.

Hereinafter, TN and IPS mode liquid crystal display devices will be illustrated in this order.

As shown in FIG. 8A and 9, in the TN mode LCD, the first substrate 100 comprises a black matrix layer 101 to shield light to regions (i.e., portions corresponding to the gate lines, the data lines and the thin film transistors) other than the pixel regions; R, G and B color filter layers 102 to render colors in the corresponding pixel regions; and a common electrode 103 arranged over the entire surface of the black matrix layer 101 and the color filter layers 102. In addition, the first substrate 100 further comprises a first alignment film 104 arranged over the entire surface of the common electrode 103, and spacers 150 arranged in the form of aggregates including balls 151 and a solid 152 on the first alignment film 104. In some cases, the spacers 150 may be arranged on the second substrate 200.

The step of forming the spacers 150 comprises jetting a spacer-forming material 160 consisting of the balls 151, the liquid thermosetting binder liquidized from the solid 152 and the solvent 153 in predetermined portions, followed by heating. In the process of heating, the liquid thermosetting binder is adhered to the first substrate 100 or the second substrate 200 adjacent to the balls 151 and then cured, to form a solid, while the solvent 153 is vaporized.

The curing is carried out by heating at 80 to 300° C.

The liquid thermosetting binder includes at least one organic compound selected from acrylic, urethane and epoxy compounds. Alternatively, the liquid thermosetting binder may include a silicone compound.

The solvent 153 is selected from those that have a boiling point of 60 to 300° C. For example, glycol ether may be used as the solvent. Examples of useful glycol ethers include propylene glycol methyl ether (PGME), dipropylene glycol methyl ether (DGME), tripropylene glycol methyl ether (TGME), propylene glycol methyl ether acetate (PGMEA), dipropylene glycol methyl ether acetate (DGMEA), propylene glycol n-propyl ether (PGPE), dipropylene glycol n-propyl ether (DGPE), propylene glycol n-butyl ether (PGBE), dipropylene glycol n-butyl ether (DGBE), tripropylene glycol n-butyl ether (TGBE), propylene glycol phenyl ether (PGPE), propylene glycol diacetate (PGD), dipropylene glycol dimethyl ether (DGDE), diethylene glycol ethyl ether (DGEE), diethylene glycol methyl ether (DGME), diethylene glycol n-butyl ether (DGBE), diethylene glycol hexyl ether (DGHE), diethylene glycol n-butyl ether acetate (DGBEA), ethylene glycol propyl ether (EGPE), ethylene glycol n-butyl ether (EGBE), ethylene glycol hexyl ether (EGHE), ethylene glycol n-butyl ether acetate (EGBEA), triethylene glycol methyl ether (TGME), triethylene glycol ethyl ether (TGEE), triethylene glycol n-butyl ether (TGBE), ethylene glycol phenyl ether (EGPE) and ethylene glycol n-butyl ether mixtures (EGBEM).

Preferably, the solvent 153 has a surface tension of 20 to 80 dynes/cm, a viscosity of 1 to 30 cP and a density of 0.8 to 1.2 g/cc at ambient temperature. Based on these properties, the solvent 153 is vaporized and removed during curing.

With respect to the composition of the spacer material 160, the spacer material 160 comprises: a liquid component consisting of 1 to 20 wt % of the liquid thermosetting binder, and the remaining weight, i.e., 80 to 98 wt %, of the solvent; and 0.1 to 3 wt % of the balls, with respect to 100 wt % of the total weight of the liquid component.

The second substrate 200 that faces the first substrate 100 comprises gate lines 201 and data lines 202 arranged on the second substrate 200 that intersect each other to define pixel regions, pixel electrodes 203 formed in the respective pixel regions, and thin film transistors (TFT) formed at respective intersections between the gate lines 101 and the data lines 202.

The second substrate further comprises spacers 150 arranged such that they are within the width of the gate lines 201 or the data lines 202. As shown in the drawings, spacers 150 are arranged on the gate lines 201.

Hereinafter, a method for manufacturing the thin film transistors and the pixel electrodes will be illustrated in detail.

A metal such as Mo, Al or Cr is deposited on a second substrate 200 and is then patterned through photolithographic processes to simultaneously form a plurality of gate lines 201 and gate electrodes 201a.

Each gate electrode 201a is formed in a protrusion shape protruded from an associated one of the gate lines 201 in a predetermined position provided by each pixel region.

An insulating material such as $SiN_x$ is then deposited over the entire surface of the second substrate 200 including the gate lines 201 and the gate electrodes 201a, to form a gate insulating film 211. A semiconductor layer material is deposited over the gate insulating film 211 and is then patterned to form a semiconductor layer 214 on the gate insulating film 211 arranged on the gate electrode 201a.

The formation of the semiconductor layer 214 is achieved by sequentially depositing an amorphous silicon layer (or a polysilicon layer) and a silicon layer heavily doped with an impurity, and simultaneously patterning the amorphous silicon layer (or the polysilicon layer) and the doped silicon layer.

Subsequently, a metal material such as Mo, Al, or Cr is deposited over the entire surface of the resulting structure and is then patterned through photolithographic processes, to form data lines 202 such that they expand perpendicular to the gate lines 201, and source electrodes 202a and drain electrodes 202b such that they are in contact with opposite sides of the semiconductor layer 214. The doped silicon layer which is in the space between the source electrode 202a and the drain electrode 202b is removed.

Each source electrode 202a has a protrusion shape protruded from an associated one of the data lines 202.

Thereafter, a passivation film 212 is deposited over the entire surface of the resulting structure including the source and drain electrodes 202a and 202b.

For the material of the passivation film 212, an inorganic material such as $SiN_x$ is conventionally used. However, an organic material having a low dielectric constant, such as benzocyclobutene (BCB), spin-on-glass (SOG), or acryl resin, has recently been used to achieve an enhancement in the aspect ratio of liquid crystal cells.

Subsequently, the portion of the passivation film 212 arranged on each drain electrode 202b is selectively etched, to form a drain contact hole, through which the drain electrode 202b is partially exposed.

Next, a transparent insulating film is deposited over the passivation film 212 such that it is in electrical contact with the drain electrode 202b through the drain contact hole, and is then selectively removed such that only the pixel region remains, to from a pixel electrode 203.

A second alignment film 213 is formed over the passivation film 212 including the pixel electrode 203.

Optionally, the first and second alignment films 104 and 213 may be formed or not formed.

An example where the liquid crystal display device of the present invention is applied to an IPS mode LCD will be illustrated in detail with reference to FIGS. 8B and 9.

The IPS mode LCD device according to the present invention comprises: a black matrix layer 101 arranged on the first substrate 100 to shield light to regions (i.e., portions corresponding to the gate lines, the data lines and the thin film transistors) other than the pixel regions; R, G and B color filter layers 102 to render colors in the corresponding pixel regions; and an overcoat layer 103 arranged over the entire surface of the black matrix layer 101 and the color filter layers 102.

A first alignment film 104 is arranged on the overcoat layer 103 and spacers 150 are arranged in regions provided by the black matrix layer 101 on the first alignment film 104. Here, the spacers are formed in accordance with the process as mentioned above.

A plurality of gate lines 201 and a plurality of data lines 202 are arranged on the second substrate 200 that faces the first substrate 100, such that the gate lines 201 and the data lines 202 intersect each other, to define pixel regions. In addition, common lines 215a are arranged on the second substrate 200 such that the common lines extend in parallel to the gate lines 201. Common electrodes 215 are protruded from the common lines 215a in respective pixels such that they are uniformly spaced apart from each other. In addition, thin film transistors (TFTs) including source/drain electrodes 202a and 202b are located at respective intersections of the gate lines 201 and the data lines 202. Pixel electrodes 216 expand parallel to the common electrodes 215 between the common electrodes at respective pixels, while being connected to the drain electrodes 202b of the thin film transistors.

Hereinafter, a method for manufacturing the thin film transistors, the common electrodes and the pixel electrodes will be illustrated in detail.

A metal such as Mo, Al or Cr is deposited on the second substrate 200 and is then patterned through photolithographic processes to simultaneously form a plurality of gate lines 201, gate electrodes 201a, common lines 215a and common electrodes 215.

Each gate electrode 201a is formed in a protrusion shape protruded from an associated one of the gate lines 201 in a predetermined position provided by each pixel region.

An insulating material such as $SiN_x$ is then deposited over the entire surface of the second substrate 200 including the gate lines 201, the common lines 215a, the gate electrodes 210a and the common electrodes 215, to form a gate insulating film 211. A semiconductor layer is deposited over the gate insulating film 211 and then patterned to form a semiconductor layer 214 on the gate insulating film 211 arranged on the gate electrode 201a.

The formation of the semiconductor layer 214 is achieved by sequentially depositing an amorphous silicon layer (or a polysilicon layer) and a silicon layer heavily doped with an impurity, and simultaneously patterning the amorphous silicon layer (or the polysilicon layer) and the doped silicon layer.

Subsequently, a metal material such as Mo, Al, or Cr is deposited over the entire surface of the resulting structure and then patterned through photolithographic processes, to form data lines 202 such that they expand perpendicular to the gate lines 201, and source electrodes 202a and drain electrodes 202b such that they are in contact with opposite sides of the semiconductor layer 214. The doped silicon layer which is in the space between the source electrode 202a and the drain electrode 202b is removed.

Each source electrode 202a has a protrusion shape protruded from an associated one of the data lines 202.

Thereafter, a passivation film 212 is deposited over the entire surface of the second substrate 200 including the source and drain electrodes 202a and 202b.

For the material of the passivation film 212, an inorganic material such as $SiN_x$ is conventionally used. However, an organic material having a low dielectric constant, such as benzocyclobutene (BCB), spin-on-glass (SOG), or an acryl resin, has recently been used to achieve an enhancement in the aspect ratio of liquid crystal cells.

Subsequently, the portion of the passivation film 212 arranged on each drain electrode 202b is selectively etched, to form a drain contact hole, through which the drain electrode 202b is partially exposed.

Next, a transparent electrode material is deposited over the passivation film 212 and is then selectively removed, to form pixel electrodes 216 alternately formed with the common electrodes 215 at respective pixels.

For the afore-mentioned IPS mode LCD device, the common and pixel electrodes are formed of different materials (i.e., the common electrode is made of a metal and the pixel electrode is made of a transparent electrode) on the different layers. Alternatively, the common electrode and the pixel electrode may be formed of the same transparent electrode material on the same layer.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
a first substrate and a second substrate facing each other, wherein each of the first and second substrates includes a plurality of pixel regions spaced apart from each other to form a matrix;
a black matrix layer arranged in a region excluding the pixel regions on the first substrate;
a plurality of gate lines and a plurality of data lines crossing each other, are corresponding to the black matrix layer on the second substrate;
a plurality of spacers arranged in predetermined portions provided on the black matrix layer between the first and second substrates, wherein each of the plurality of spacers includes one or more balls, and a solid to adhere the one or more balls to the first or second substrate and wherein the solid is formed of at least one of organic acrylic compound and urethane; and
a liquid crystal layer filled between the first substrate and the second substrate,
wherein the organic acrylic compound includes ethyl methacrylate, N-butyl methacrylate, isobutyl methacrylate, dicyclopentanyl methacrylate, benzyl methacrylate, glycidyl methacrylate, 2-hydroxyethyl methacrylate, methacrylic acid isobornyl methacrylate and styrene polymers, and combinations thereof.

2. The liquid crystal display device according to claim 1, wherein the plurality of spacers are formed by ink-jetting a spacer-forming material comprising the balls, a thermosetting binder liquidized from the solid, and the solvent, followed by curing,
wherein in the process of curing, the thermosetting binder is cured, while the solvent is vaporized.

3. The liquid crystal display device according to claim 2, wherein the curing is carried out at 80 to 300° C.

4. The liquid crystal display device according to claim 1, wherein the balls are aggregated together by aid of the solid.

5. The liquid crystal display device according to claim 1, wherein the plurality of spacers comprising the one or more balls and the solid are formed in portions provided on the plurality of gate lines or the plurality of data lines, and a width of the spacers is smaller than a width of the plurality of gate lines or the plurality of data lines.

6. The liquid crystal display device according to claim 1, further comprising:
   a color filter layer formed on the second substrate including the black matrix layer; and
   an overcoat layer or a common electrode formed on the color filter layer.

7. The liquid crystal display device according to claim 6, further comprising:
   a first alignment film formed on the overcoat layer or the common electrode; and
   a second alignment film formed on the second substrate including the plurality of gate lines or the plurality of data lines.

8. The liquid crystal display device according to claim 7, wherein the plurality of spacers are formed on the first alignment film.

9. The liquid crystal display device according to claim 7, wherein the first alignment film is formed on the plurality of spacers.

* * * * *